(12) United States Patent
Gabrielsson et al.

(10) Patent No.: US 7,481,986 B2
(45) Date of Patent: Jan. 27, 2009

(54) METHOD AND SYSTEM FOR INJECTION OF A SOLUTION INTO A GAS STREAM

(75) Inventors: Pär L. T. Gabrielsson, Helsingborg (SE); Ingvard Bjørn, Hellerup (DK)

(73) Assignee: Haldor Topsoe A/S, Lyngby (DK)

( * ) Notice: Subject to any disclaimer, the term of this patent is extended or adjusted under 35 U.S.C. 154(b) by 338 days.

(21) Appl. No.: 11/433,561

(22) Filed: May 15, 2006

(65) Prior Publication Data

US 2006/0275192 A1     Dec. 7, 2006

(30) Foreign Application Priority Data

Jun. 20, 2005    (DK) .............................. 2005 00821

(51) Int. Cl.
*B01D 53/56* (2006.01)
*B01D 53/74* (2006.01)
*B01D 53/92* (2006.01)

(52) U.S. Cl. ...................................... 423/212; 423/235

(58) Field of Classification Search ................ 423/212, 423/235

See application file for complete search history.

(56) References Cited

U.S. PATENT DOCUMENTS 6,203,770 B1    3/2001   Peter-Hoblyn et al.

6,761,868 B2 *  7/2004   Brooks et al. ............... 423/358

FOREIGN PATENT DOCUMENTS

| DE | 42 03 807 | 8/1993 |
|---|---|---|
| EP | 1 052 009 | 11/2000 |
| JP | 2002-306929 | 10/2002 |
| JP | 2003-278530 | 10/2003 |
| WO | WO 2003/036054 | 5/2003 |
| WO | WO 2005/103459 | 11/2005 |

* cited by examiner

*Primary Examiner*—Timothy C Vanoy
(74) *Attorney, Agent, or Firm*—Dickstein Shapiro LLP

(57) ABSTRACT

A method and a system for injection of a solution of a compound into a gas at elevated temperature. The method includes the steps of injecting the solution into an injection channel being provided into at least a portion of an outer channel and being surrounded by and spaced apart from the outer channel, passing the gas along space between inner wall of the outer channel and outer wall of the injection channel and along inner space of the injection channel, evaporating the solution in and on inner wall of the injection channel, and decomposing the compound in and on the inner wall of the injection channel and in the gas. The solution can be aqueous solution comprising urea or ammonia, the gas is an exhaust gas from combustion, and the injection channel is a cylindrical channel concentrically installed in the outer channel.

3 Claims, 2 Drawing Sheets

METHOD AND SYSTEM FOR INJECTION OF A SOLUTION INTO A GAS STREAM

BACKGROUND OF THE INVENTION

1. Field of the Invention

The invention relates to injection of a solution into a hot gas.

The invention is specifically directed to injection of an aqueous solution of urea into an exhaust gas from an engine for example from a diesel engine installed in a vehicle.

2. Description of Related Art

Processes for catalytic reduction of nitrogen oxides in an exhaust gas are known in the art. One is disclosed in DE 4203807, where a urea solution is injected and an evaporator is installed just downstream of the injection. The evaporator is preferably covered by a hydrolysis catalyst to quantitatively decompose the urea and avoid deposit on the downstream reduction catalyst.

The problem of deposition of urea is also dealt with in Japanese patent JP 8206459. Here the deposition of urea is prevented by mixing a urea solution with water upstream of an injection nozzle. Signals from engine control are used to control the mixing ratio, so when a small amount of urea is required during low load of engine, more water is used in order to prevent blocking with urea in the nozzle.

Also JP 2002306929 considers solidification of injected urea into an exhaust gas. The nozzle is housed in a cover, and then downstream of this the hot exhaust gas is introduced, and then a catalyst is needed for decomposition of urea.

Another approach to solving the problem of urea deposit is disclosed in JP 2003278530, where the nozzle is surrounded by a thick wall, and the nozzle tip is surrounded by a cover with a deflecting bottom, after which the urea solution is introduced to the exhaust gas.

To avoid fouling by urea in a selective catalytic reduction unit in exhaust gas in vehicles, U.S. Pat. No. 6,203,770 discloses a process, where the urea is decomposed in a separate chamber before the solution is sprayed into the exhaust gas.

A process for injection of a urea solution into exhaust gas is disclosed in EP 1 052 009. In this process a side stream is conducted through a porous body acting as an evaporator or through a catalytic reactor, where hydrolysis of urea takes place before the side stream is combined with the main stream. This process requires control of the side stream flow and an evaporating and/or hydrolysing device to create a mixture of ammonia and exhaust gas upstream of a selective catalytic reduction of nitrogen oxides.

In WO 2005/103 459 exhaust gas is added a reducing agent by injection into a smooth shell surrounded by spacers pressing against the enlarged shell when hot.

To obtain turbulence in an exhaust gas for improved mixing between an injected reducing agent and the gas, an elaborate device is installed as disclosed in WO 03/036 054.

A common disadvantage of known art is that additional equipment is required in form of evaporator, hydrolysis reactor, water tanks, thick housing, exhaust gas injection device, mixers or separate chamber and some of them even result in risk of cooling down the urea solution, which should have been thermally decomposed. The additional equipment occupies space in an exhaust gas pipe, which is a problem especially in vehicles, where only limited space is available.

The object of the invention is to provide an apparatus for urea solution injection with subsequent evaporation and thermal decomposition of urea without incomplete evaporation or deposition of incomplete decomposed urea and without requirement of additional space in an exhaust gas channel.

SUMMARY OF THE INVENTION

The invention provides a method and a system for injection of a solution of a compound into a gas at elevated temperature, evaporating the solution and decomposing the compound in the gas at the elevated temperature. The method comprises injecting the solution into an injection channel being provided for into at least a portion of an outer channel and being surrounded by and spaced apart from the outer channel passing the gas along space between inner wall of the outer channel and outer wall of the injection channel and along inner space of the injection channel, evaporating the solution in or on an inner surface of the injection channel and decomposing the compound in or on the inner surface of the injection channel or in the gas.

The invention is especially related to a method and a system for injection of a solution of a compound into a gas, where the solution is an aqueous solution of urea and the gas is an exhaust gas from a combustion taking place in a diesel engine installed in a vehicle, a vessel or a power plan.

The invention is related to a method and a system for injection of a solution into a gas into an injection channel, where the injection channel is a cylindrical channel, a cylindrical corrugated channel, a channel with grooved inner surface or an at least partially tapered channel concentrically installed in an outer channel.

The invention is especially useful in exhaust gas pipes in diesel driven vehicles and vessels, where space is limited, for reducing the content of nitrogen oxides by urea solution injection substantially without urea deposition.

DETAILED DESCRIPTION OF THE INVENTION

Figure 1:
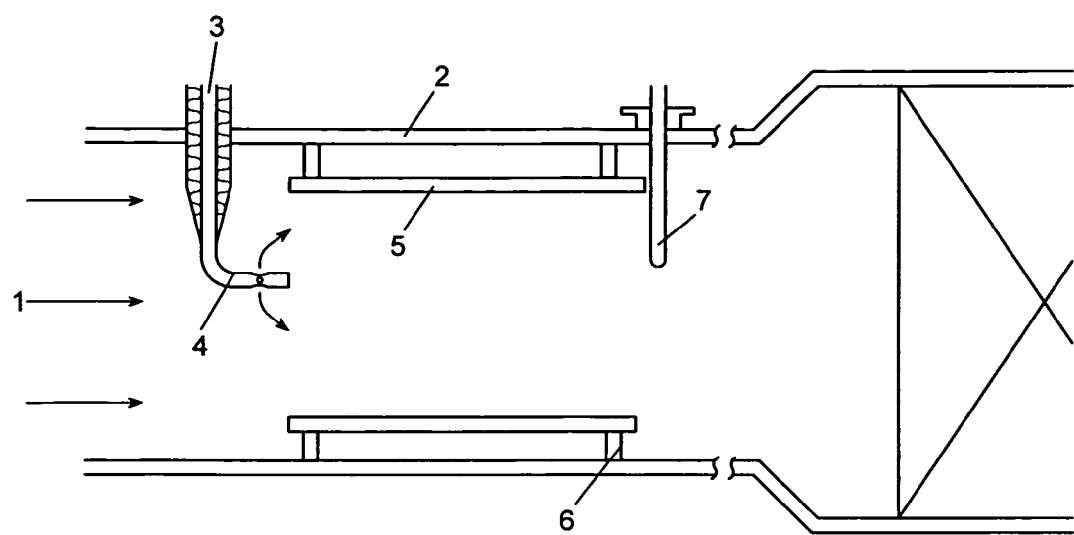
FIG. 1 is a cross section of an exhaust gas channel with a urea injection system according to the invention.

In diesel driven engines combustion takes place with a certain amount of excess air. This results in formation of nitrogen oxides, $NO_x$ in the exhaust gas, which is a serious pollution for the environment.

$NO_x$ can be reduced by ammonia, $NH_3$, which however is difficult to store especially in vehicles, and an aqueous solution of urea, $H_2NCONH_2$ is therefore used as a reducing agent.

The ammonia is formed when urea decomposes as it is sprayed out and mixed with the hot exhaust gas according to the following reaction:

$$H_2NCONH_2 + H_2O \rightarrow 2NH_3, +CO_2$$

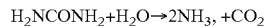

Urea decomposes completely only if the temperature exceeds 200° C. Thus 200° C. is the lowest temperature at which urea can be injected to the exhaust gas.

If the urea solution is not evaporated and decomposed instantly when leaving the tip of the injection nozzle, some of the urea solution will hit the inner-surface of the exhaust gas channel. This is normally colder than the exhaust gas, as the exhaust gas channel is surrounded by ambient air, and when hitting the surface, the solution will remain liquid and will not decompose, it can even create a solid deposition on the inner surface.

When all the urea solution does not evaporate, this liquid will be running along the channel and will be having difficulties to evaporate. The solution could escape through small leakages in the exhaust gas channel and deposit on the outer surface of the channel. Escaped solution might even drip from the leakage and deposit below this leakage.

If deposition of urea occurs in smaller channels, such as in cars or vans, it will decrease the flow area in the exhaust gas pipe resulting in higher pressure drop and higher linear gas velocity in the pipe. This creates the risk of urea deposition on a downstream reduction catalyst, especially when starting with cold engine and exhaust gas system.

Further, urea in droplets is not decomposed to ammonia, which should have contributed to reduce $NO_x$ to $N_2$.

The invention provides a method and apparatus for injection of a urea solution into an exhaust gas or a flue gas without risk of deposition of urea solution on the inner-surface of the channel, wherein the exhaust gas flows. It provides further for improved mixing of the solution and exhaust gas and improved evaporation of the solution.

This is obtained by installing an injection channel around the tip of the injection nozzle. The injection channel is installed with a certain distance from the surrounding outer channel, and the hot exhaust gas is flowing on both sides of the injection channel keeping it warm. Liquid urea solution evaporates and decomposes, when it hits the hot injection channel, as it has the same temperature as the exhaust gas.

The installed injection channel is a corrugated cylindrical channel, helically grooved channel or at least a partly tapered channel, which improves the mixing and the evaporation and creates less tension on the channel when heated.

The injection channel is kept at a certain distance from the outer channels by spacers and is kept in position by arresting devices. The arresting devices can be the injection nozzle at the inlet end and a thermowell at the outlet end. They can also be some more and bigger spacers, which extend into a flange connection on the outer exhaust gas channel or which are welded to the inner surface of the outer channel at one end of the injection channel.

The injection nozzle is preferably insulated to maintain the conditions of the urea solution until it is injected into the hot exhaust gas, thereby avoiding evaporation of the water and risking blockage of the injection nozzle.

The invention is very useful with exhaust gas temperatures between 100° C. and 600° C.

To obtain a favourable flow area in the annular space between the two channels it has been found that the ratio of the diameter of the injection channel and outer channel should be 0.5-1.0, preferably 0.6-0.9.

The invention is described in more detail by FIGS. 1, 2, 3, and 4 and illustrated by experiments.

On FIG. 1 exhaust gas 1 is flowing in outer gas channel 2 and an aqueous solution of urea 3 is injected by injection nozzle 4 into the exhaust gas 1. Around the nozzle 4 an injection channel 5 is installed. It is spaced apart from the outer channel 2 and kept in position by spacers 6. This enables the exhaust gas 1 to flow on both sides of the injection channel 5, which thereby is kept at the same temperature as the exhaust gas 1. The injection channel 5 prevents not-evaporated solution with not-decomposed urea to hit the cold inner-surface of the outer channel 2, which is surrounded by atmospheric air at ambient temperature.

The injection channel 5 is concentrically installed in the exhaust gas pipe 2.

In this embodiment of the invention, the injection channel is kept in position by the injection nozzle 4 and a thermowell 7. The injection nozzle 4 is insulated in order to maintain the temperature of the solution and thereby avoid crystallisation or evaporation of water in the urea solution before injection into the exhaust gas.

Figure 2:
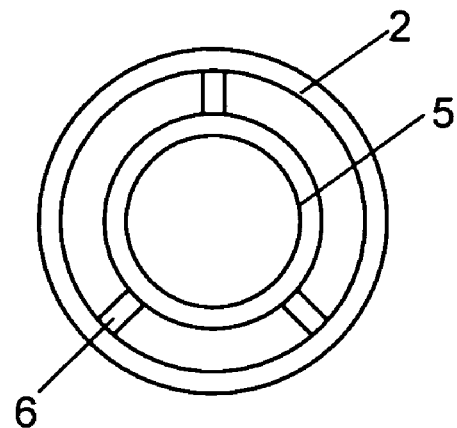
FIG. 2 is a sketch showing a cross section of an injection system.

FIG. 2 is a very schematic drawing showing how the injection channel 5 is kept in position and spaced apart from the exhaust gas pipe 2 by three spacers 6.

Figure 3:
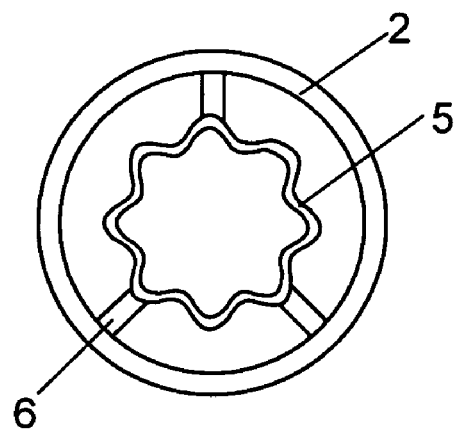
FIG. 3 is a sketch showing a cross section of the injection system according to one embodiment of the invention.
Figure 4:
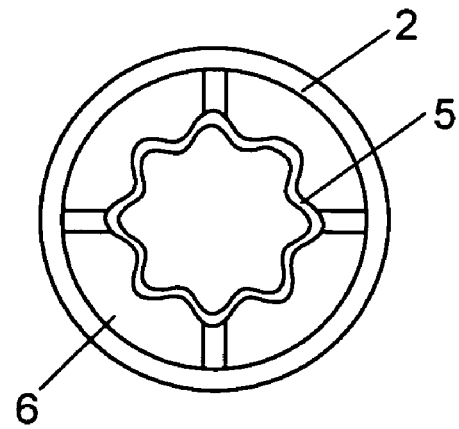
FIG. 4 is a sketch showing a cross section of the injection system according to another embodiment of the invention.

The shape of the injection channel 5 can be a corrugated pipe as shown on FIGS. 3 and 4. This has the advantage that the surface of the injection channel is larger than the surface of a smooth pipe with the same diameter. Further, it can freely expand inside the much colder exhaust gas pipe 2 with less tension on the outer channel 2 from the spacers 6.

In another embodiment of the invention the inner surface of the injection channel is grooved, preferably the groove is helical. Consequently, the residence time of the possible droplets increases in the warm injection channel and more droplets will evaporate before leaving the injection channel.

In another embodiment of the invention, the injection channel is tapered. Thereby, the possible droplets leave the injection channel at a higher linear velocity and are less inclined to hit the colder inner wall of the outer exhaust gas channel and remain as droplets.

In a preferred embodiment of the invention, where it is installed in an exhaust gas pipe in a van and where the pipe typically has a diameter of 110 mm, the length of the injection channel 5 is 250-350 mm, preferably 290-310 mm, the outer diameter of injection channel 5 is 80-90 mm, and the thickness of the injection channel 5 is typically 2 mm.

The spacer 6 typically has a length of 8-12 mm, the height is 1 mm less than the gap between the outer channel 2 and the injection channel 5. The width of the spacer 6 is typically 1-2 mm. The injection channel 5 is made from stainless steel such as SS 316.

Requirement of cleaner environment has lead to cleaning of exhaust gas from combustion engines. Often the nitrogen oxides are removed by reduction to nitrogen by injection of an aqueous solution of urea. Performance of this reduction process is considerably improved by installing the reduction system of the invention in exhaust gas channels, especially in diesel driven vans, lorries, cars and vessels and in power plants.

Test Results

Tests were carried out with an exhaust gas from a diesel engine. An aqueous solution of urea was injected into a glass pipe and the flow could be observed.

Downstream of the urea solution injection, a nitrogen oxide (NOx) reduction catalyst was installed and the concentration of NOx in the exhaust gas was measured upstream and downstream of the catalyst.

First tests were performed in the "empty" glass pipe and then tests were performed with the injection channel of the invention installed.

Photos were taken of the flow in the glass pipe during the tests.

The test equipment had following characteristics:

The glass tube was 570 mm long with a diameter of 130 mm. The injection channel was 300 mm long and having a diameter of 84 mm.

The distance between nozzle holes and outlet end of injection channel was 200 mm.

The injection nozzle was equipped with 4 holes each having a diameter of 0.55 mm.

The injection channel was kept apart from the outer glass channel by 3 spacers, each 10 mm long, 14.5 mm high and 1.5 mm wide.

The channel was kept in position by 3 higher spacers, 19.5 mm high extending into a flange connection on the exhaust gas pipe.

The test was performed with 1020 kg/h exhaust gas and urea solution with 32.5% by weight.

The temperature of the gas was 300° C. and the urea solution had strength of 32.5% by weight.

The concentration of $NO_x$ was 703 ppm inlet of the catalyst. The catalyst was a Denox catalyst, DNX™ from Haldor Topsøe A/S.

First test was run with 36 g/min urea solution injected into the glass exhaust pipe. The $NO_x$ concentration was measured to 74 ppm outlet of the catalyst. Traces of urea solution were seen along the wall of the glass exhaust pipe.

Second test was run with 71 g/min urea solution injected into the glass exhaust pipe. The $NO_x$ concentration was measured to 74 ppm outlet of the catalyst. Urea solution was seen flowing along the glass wall.

Third test was run with an injection channel of the invention installed. 36 g/min urea solution injected into the glass exhaust pipe and the $NO_x$ concentration was measured to 56 ppm outlet of the catalyst. Only a few drops of urea solution were seen on the glass wall.

Fourth test was run with an injection channel of the invention installed. 70 g/min urea solution injected into the glass exhaust pipe and the $NO_x$ concentration was measured to 56 ppm outlet of the catalyst. Droplets of urea solution were seen, however, no liquid solution was seen flowing along the wall of the glass exhaust pipe.

Tests 1 and 3 were executed with the same amount of injected liquid, but without and with injection channel installed, respectively, thereby the effect of the injection channel could be seen. Without injection channel installed, liquid urea solution was still present in the exhaust gas, whereas with the injection channel installed only few droplets of solution remained in the exhaust gas.

Similarly, tests 2 and 4 were executed with the same, but increased amount of injected liquid and without and with injection channel installed, respectively. Without injection channel installed, liquid urea solution was running on the exhaust gas pipe, whereas with the injection channel installed only droplets of solution remained in the exhaust gas.

Thereby, it is clearly seen that an injection channel prevents that the injected solution remains as a liquid in the exhaust gas pipe. At the same time the $NO_x$ conversion is increased.

The invention claimed is:

1. A method for injection of a solution of a compound into a gas at elevated temperature, evaporating the solution and decomposing the compound in the gas at the elevated temperature, which method comprises injecting the solution into an injection channel being a corrugated cylindrical, helically grooved or an at least partly tapered injection channel being provided into at least a portion of an outer channel and being surrounded by and spaced apart from the outer channel;

passing the gas along space between inner wall of the outer channel and outer wall of the injection channel and along inner space of the injection channel;

evaporating the solution in and on inner wall of the injection channel; and decomposing the compound in and on the inner wall of the injection channel and in the gas.

2. A method according to claim 1, wherein the solution is an aqueous solution comprising urea or ammonia, and the gas is an exhaust gas from combustion.

3. A method according to claim 2, wherein the combustion takes place in a diesel engine installed in a vehicle, a vessel or a power plant.

* * * * *